United States Patent
Kang et al.

(10) Patent No.: US 10,859,873 B2
(45) Date of Patent: Dec. 8, 2020

(54) DISPLAY DEVICE WITH LASER DIODE EXCITATION

(71) Applicant: Samsung Display Co. Ltd., Yongin-si (KR)

(72) Inventors: Eui Jeong Kang, Suwon-si (KR); Young Chun Kim, Hwaseong-si (KR); Seok Hyun Nam, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 213 days.

(21) Appl. No.: 15/918,593

(22) Filed: Mar. 12, 2018

(65) Prior Publication Data
US 2018/0284541 A1   Oct. 4, 2018

(30) Foreign Application Priority Data

Apr. 3, 2017 (KR) .................. 10-2017-0042896

(51) Int. Cl.
*G02F 1/13357* (2006.01)
*G02F 1/1335* (2006.01)
(Continued)

(52) U.S. Cl.
CPC .. *G02F 1/133617* (2013.01); *G02F 1/133621* (2013.01); *G02B 6/0003* (2013.01); *G02B 6/009* (2013.01); *G02B 6/0055* (2013.01); *G02B 6/0068* (2013.01); *G02B 6/0088* (2013.01); *G02F 1/1368* (2013.01); *G02F 1/133512* (2013.01); *G02F 1/133514* (2013.01); *G02F 2001/133548* (2013.01); *G02F 2001/133614* (2013.01); *G02F 2202/36* (2013.01); *G02F 2203/01* (2013.01); *G02F 2203/05* (2013.01)

(58) Field of Classification Search
CPC ......... G02F 1/133614; G02F 1/133615; G02F 1/133524; G02F 1/133617; G02F 1/133621; G02F 2001/133614; G02B 6/005; G02B 6/0051; G02B 6/0055; G02B 6/0066; G02B 6/0068; G02B 6/0073; G02B 6/0088; F21K 9/64; F21V 9/20; F21V 9/30
See application file for complete search history.

(56) References Cited

U.S. PATENT DOCUMENTS

| 6,586,874 B1 * | 7/2003 | Komoto ............... G02B 6/0023 257/100 |
| 2012/0019740 A1 * | 1/2012 | Kadowaki .............. G02B 5/201 349/61 |

(Continued)

FOREIGN PATENT DOCUMENTS

| KR | 1020120134240 | 12/2012 |
| KR | 1020130104862 | 9/2013 |
| KR | 101348565 | 1/2014 |

*Primary Examiner* — Isiaka O Akanbi
*Assistant Examiner* — Steven Y Horikoshi
(74) *Attorney, Agent, or Firm* — Cantor Colburn LLP

(57) ABSTRACT

A display device includes a display panel, and a backlight unit which provides first light to the display panel, the first light being a combination of light having a first peak wavelength and light having a second peak wavelength. The display panel includes a wavelength conversion layer which converts a peak wavelength of the first light. The backlight unit includes laser diodes emitting the light having the second peak wavelength, and where the wavelength conversion layer includes quantum dots or phosphor.

8 Claims, 18 Drawing Sheets

(51) Int. Cl.
*F21V 8/00* (2006.01)
*G02F 1/1368* (2006.01)

(56) References Cited

U.S. PATENT DOCUMENTS

| | | | |
|---|---|---|---|
| 2012/0274878 A1* | 11/2012 | Kunz | H01L 33/50 349/69 |
| 2013/0021549 A1* | 1/2013 | Fujita | G02F 1/133617 349/41 |
| 2013/0033901 A1* | 2/2013 | Nishitani | G02B 6/0036 362/613 |
| 2014/0332829 A1* | 11/2014 | Fan | G02B 6/0001 257/89 |
| 2017/0003548 A1* | 1/2017 | Mizunuma | G02F 1/133617 |
| 2017/0038520 A1* | 2/2017 | Fan | F21V 29/70 |

* cited by examiner

DISPLAY DEVICE WITH LASER DIODE EXCITATION

This application claims priority to Korean Patent Application No. 10-2017-0042896, filed on Apr. 3, 2017, and all the benefits accruing therefrom under 35 U.S.C. § 119, the content of which in its entirety is herein incorporated by reference.

BACKGROUND

1. Field

Exemplary embodiments of the invention relate to a display device.

2. Description of the Related Art

Display devices become more and more important as multimedia technology evolves. Accordingly, a variety of types of display devices such as liquid-crystal display ("LCD") devices and organic light-emitting display ("OLED") devices are currently used.

Among the display devices, an LCD device is one of the most broadly used flat panel display devices. An LCD device is composed of two substrates on which electrodes for generating electric field such as a pixel electrode and a common electrode are formed, and a liquid-crystal layer interposed between the pixel electrode and the common electrode. Voltages are respectively applied to the pixel and common electrodes to generate electric field in the liquid-crystal layer, such that an orientation of the liquid crystals contained in the liquid-crystal layer is aligned and a polarization of incident light is controlled, to display images.

Among such LCD devices, a vertically aligned ("VA") mode LCD, in which liquid-crystal molecules are oriented such that major axes of the liquid-crystal molecules are perpendicular to top and bottom display plates when no electric field is applied, is attracting attention since the VA mode LCD has large contrast ratio and is easy to achieve wide viewing angle.

SUMMARY

Exemplary embodiments of the invention provide a display device capable of improving color gamut.

According to exemplary embodiments of the invention, color gamut may be improved.

In addition, the device may have color gamut which meets the requirements of BT. 2020.

An exemplary embodiment of the invention discloses a display device including a display panel, and a backlight unit which provides first light to the display panel, the first light being a combination of light having a first peak wavelength and light having a second peak wavelength, where the display panel includes a wavelength conversion layer which converts a peak wavelength of the first light, where the backlight unit includes laser diodes emitting the light having the second peak wavelength, and where the wavelength conversion layer includes at least one of quantum dots and phosphor.

An exemplary embodiment of the invention also discloses a display device including a display panel, and a backlight unit which provides first light to the display panel, the first light being a combination of light having a first peak wavelength and light having a second peak wavelength, where the display panel includes a wavelength conversion layer which converts a peak wavelength of the first light so that red light having a third peak wavelength longer than the second peak wavelength is output, where the wavelength conversion layer includes at least one of quantum dots or phosphor, and where the second peak wavelength ranges from about 528 nanometers (nm) to about 534 nm.

BRIEF DESCRIPTION OF THE DRAWINGS

The above and other exemplary embodiments and features of the invention will become more apparent by describing in detail exemplary embodiments thereof with reference to the attached drawings, in which.

DETAILED DESCRIPTION

Figure 1A:
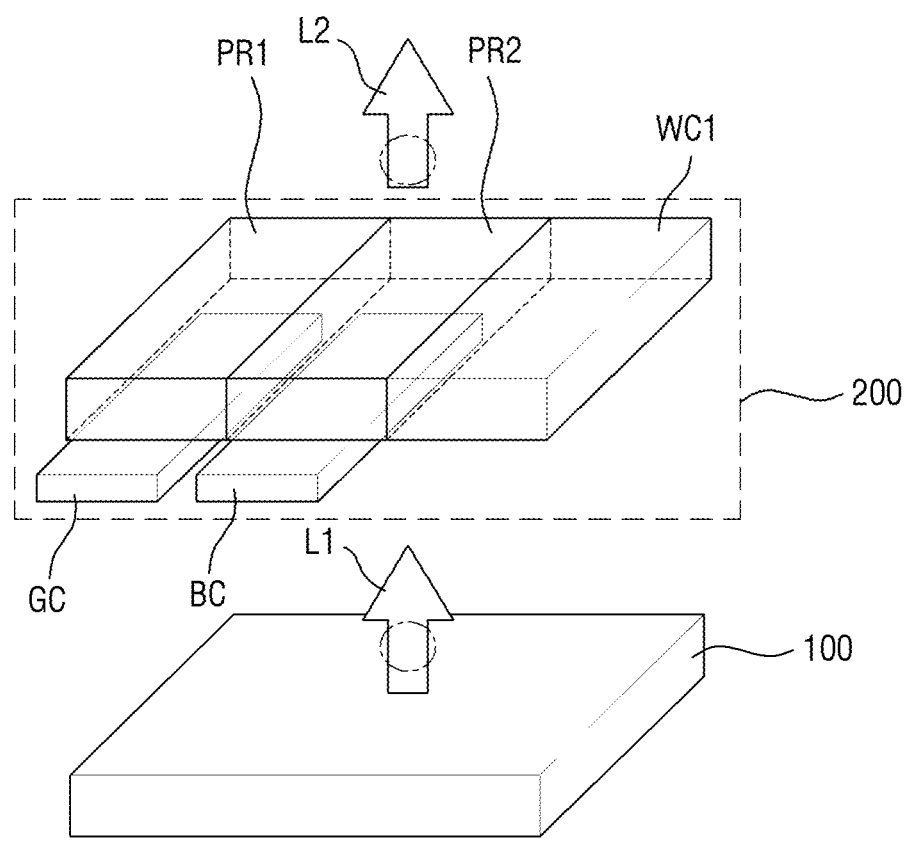
FIG. 1A is a perspective view of an exemplary embodiment of a display device according to the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying drawing figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this invention, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the invention. The ordinal number in the detailed description may not be the same as that of the claims due to an introduction order of elements in the claims. For example, "second transmissive layer" of the detailed description may correspond to "first transmissive layer" in the claims.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this invention is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, embodiments of the invention will be described with reference to the attached drawings.

Figure 1B:
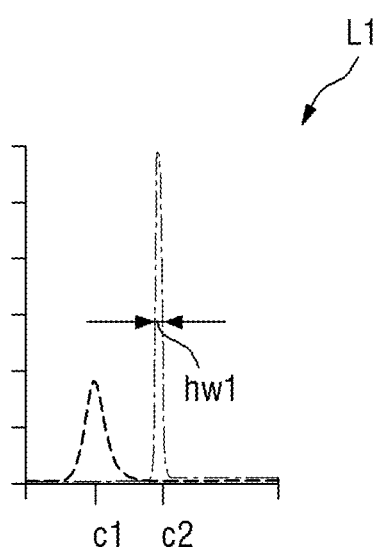
FIGS. 1B and 1C are wavelength graphs of first light and second light of the exemplary embodiment of the display device of FIG. 1A.
Figure 1C:
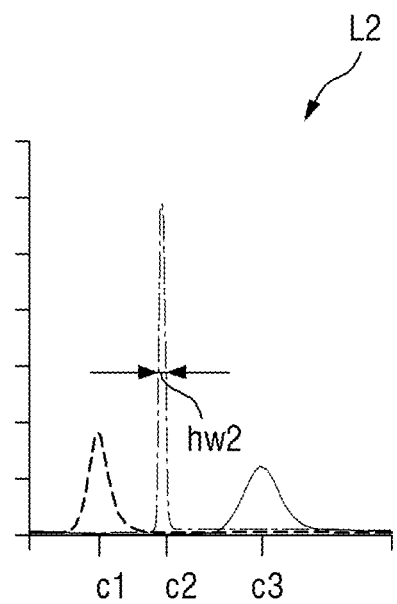

FIG. 1A is a perspective view of a display device according to an exemplary embodiment of the invention, and FIGS. 1B and 1C are wavelength graphs of first light and second light of the exemplary embodiment of the display device of FIG. 1A.

Referring to FIGS. 1A to 1C, the display device according to the exemplary embodiment of the invention may include a backlight unit 100 and a display panel 200.

The backlight unit 100 may provide first light L1 to the display panel 200. The first light L1 is defined as light emitted from the backlight unit 100. The expression "first" of the first light L1 is for distinguishing the first light L1 from second light L2 described later.

More specifically, the backlight unit 100 may include light emitting diodes ("LEDs") (refer to FIGS. 2A and 2C) that emit light having a first peak wavelength c1. In an exemplary embodiment, the LEDs may be blue LEDs, for example. In an exemplary embodiment, the first peak wavelength c1 may range from approximately 420 nanometers (nm) to approximately 480 nm, for example. That is, the light having the first peak wavelength c1 may be blue light. In addition, the backlight unit 100 may further include laser diodes LDs (refer to FIGS. 2A and 2B) emitting light having a second peak wavelength c2. In an exemplary embodiment, the laser diodes ("LDs") may be green laser diodes, for example. In an exemplary embodiment, the second peak wavelength c2 may range from approximately 528 nm to approximately 534 nm, for example. That is, the light having the second peak wavelength c2 may be green light.

The second peak wavelength c2 has a narrower wavelength range than the first peak wavelength c1. In an exemplary embodiment, the half-width hw1 of the second peak wavelength c2 may be approximately 2 nm, for example. Herein, a half-width is defined as the width at the half of the maximum value in a curve exhibiting a distribution in a mountain shape.

That is, the backlight unit 100 may provide the display panel 200 with the first light L1 in which the light having the first peak wavelength c1 and the light having the second peak wavelength c2 are mixed. In an exemplary embodiment, the first light L1 may be cyan light, for example.

The display panel 200 displays an image thereon. The display panel 200 may output second light L2 to the outside. The second light L2 is defined as light output from the display panel 200 to exit. More specifically, the display panel 200 may output the second light L2 to the outside, which is a combination of light having the first peak wavelength c1, light having the second peak wavelength c2 and light having the third peak wavelength c3. The third peak wavelength c3 may range from approximately 580 nm to approximately 680 nm. That is, the light having the third peak wavelength c3 may be red light. In an exemplary embodiment, the second light L2 in which the light having the first peak wavelength c1, the light having the second peak wavelength c2 and the light having the third peak wavelength c3 are mixed may be white light, for example.

The second peak wavelength c2 has a narrower wavelength range than the first peak wavelength c1 and the third peak wavelength c3. In an exemplary embodiment, the half-width hw2 of the second peak wavelength c2 may be approximately 2 nm, for example.

The display panel 200 may include a first transmissive layer PR1, a second transmissive layer PR2, a first wavelength conversion layer WC1, a first filter GC and a second filter BC.

The first filter GC may at least partially overlap with the first transmissive layer PR1. The first filter GC may transmit light having the first peak wavelength c1 and may block light having the second peak wavelength c2. That is, the first filter GC may transmit blue light and may block green light.

The second filter BC may at least partially overlap with the second transmissive layer PR2. The second filter BC may transmit light having the second peak wavelength c2 and may block light having the first peak wavelength c1. That is, the second filter BC may transmit green light and may block blue light.

The first transmissive layer PR1 may scatter light transmitted by the first filter GC so that the light exits. More specifically, the first transmissive layer PR1 may scatter the light having the first peak wavelength c1, i.e., the blue light so that the light having the first peak wavelength c1 exits. The second transmissive layer PR2 may scatter light transmitted by the second filter BC so that the light exits. More specifically, the second transmissive layer PR2 may scatter the light having the second peak wavelength c2, i.e., the green light, so that the light having the second peak wavelength c2 exits.

The first wavelength conversion layer WC1 may convert or shift the wavelength of the first light L1 provided from the backlight unit 100 to allow the light to exit. More specifically, the first wavelength conversion layer WC1 may convert or shift the light having the first peak wavelength c1 or the light having the second peak wavelength c2 to light having the third peak wavelength c3. In other words, the first wavelength conversion layer WC1 may convert or shift blue light or green light into red light. The light exiting from the first wavelength conversion layer WC1 may be unpolarized light whose polarization has been cancelled. Herein, an unpolarized light refers to the light that does not consist only of polarization components in a particular direction, i.e., that consists of random polarization components not polarized only in a particular direction. In an exemplary embodiment, the unpolarized light may be natural light, for example.

The materials included in the first transmissive layer PR1, the second transmissive layer PR2 and the first wavelength conversion layer WC1 will be described later with reference to FIG. 3.

Figure 2A:
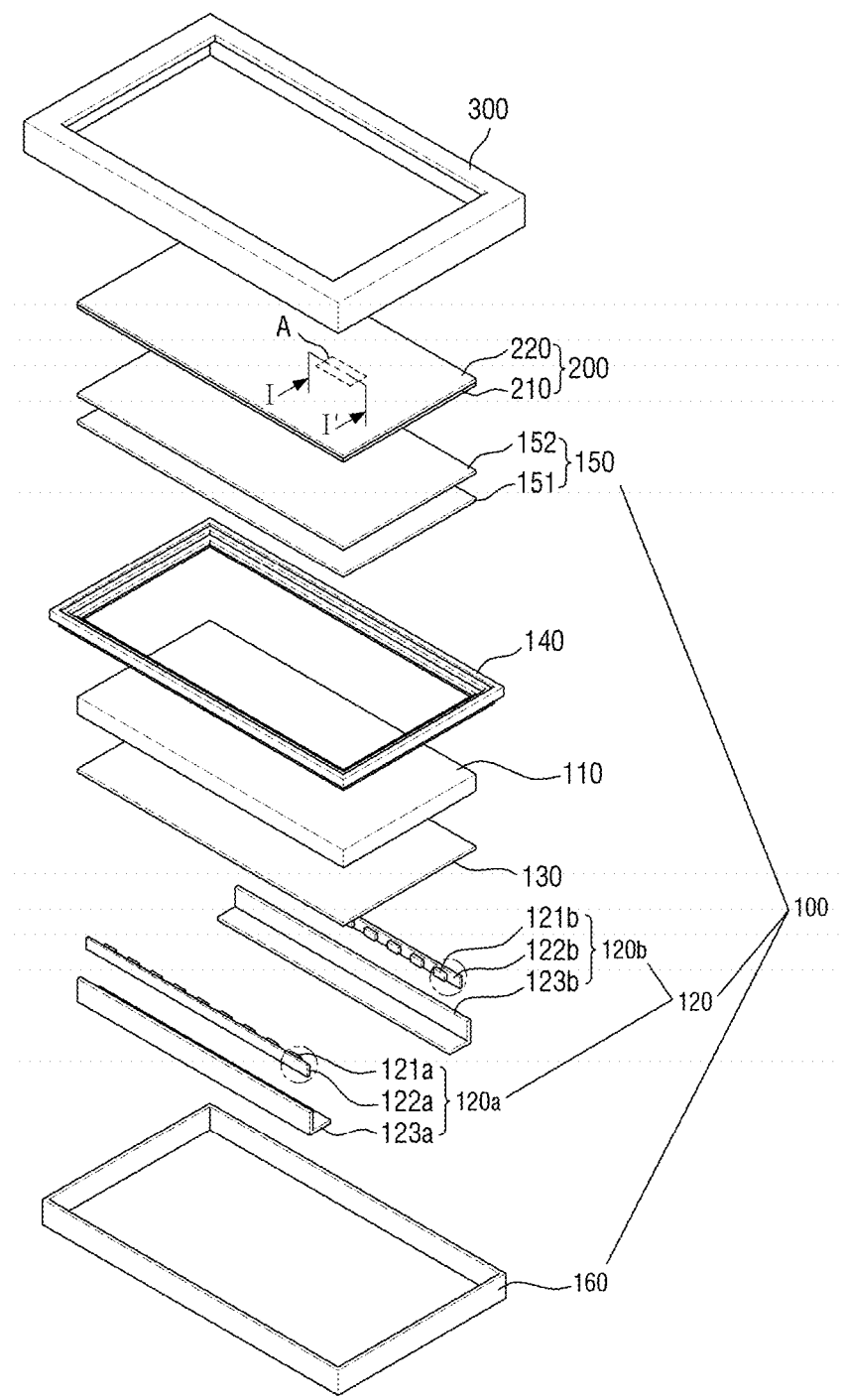
FIG. 2A is a perspective view showing in detail the exemplary embodiment of the display device according to the invention.
Figure 2B:
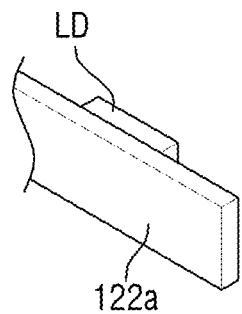
FIGS. 2B to 2D are enlarged views of portions of the exemplary embodiment of the display device of FIG. 2A.
Figure 2C:
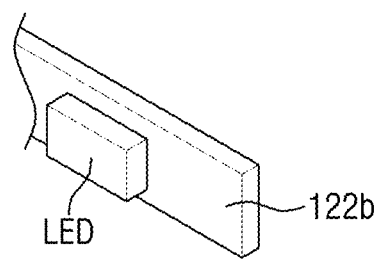
Figure 2D:
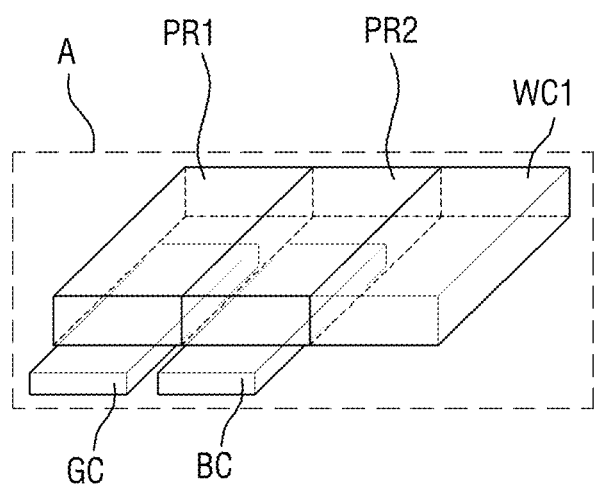

FIG. 2A is a perspective view showing in more detail the display device according to the exemplary embodiment of the invention, and FIGS. 2B to 2D are enlarged views of portions of the exemplary embodiment of the display device of FIG. 2A.

Referring to FIG. 2A, the backlight unit 100 may include a light guide plate 110, a light source module 120, a reflective sheet 130, a middle mold 140, an optical sheet 150, and a bottom chassis 160.

The light guide plate 110 provides the light from the light source module 120 to the display panel 200. The light guide plate 110 may have a rectangular shape, for example. The shape of the light guide plate 110 may vary depending on the shape of the display panel 200. The light guide plate 110 may include a light transmitting material. In an exemplary embodiment, the light guide plate 110 may include a polycarbonate series, a polysulfone series, a polyacrylate series, a polystyrene series, a polyvinyl alcohol series, a polyvinyl chloride series, a polyester, or the like, for example.

The light source module 120 may include a first sub-light source module 120a and a second sub-light source module 120b.

In an exemplary embodiment, the first sub-light source module 120a may provide light to one side of the light guide plate 110. The first sub-light source module 120a may include a plurality of first light sources 121a, a first printed circuit board ("PCB") 122a, and a first heat-dissipation plate 123a.

In an exemplary embodiment, the plurality of first light sources 121a may be laser diodes LDs emitting light having the second peak wavelength c2. That is, the plurality of first light sources 121a may be green laser diodes. The plurality of first light sources 121a may be arranged along one side of the light guide plate 110. A conductive pattern is provided on the first PCB 122a. Accordingly, the plurality of first light sources 121a may receive electrical signal through the conductive pattern and may provide the light having the second peak wavelength c2 to one side of the light guide plate 110. The first PCB 122a may be disposed on the first heat-dissipation plate 123a. The first heat-dissipation plate 123a may dissipate heat generated from the first PCB 122a or the plurality of first light sources 121a to the bottom chassis 160 or the like.

In an exemplary embodiment of the invention, the second sub-light source module 120b may provide light to the other side of the light guide plate 110. The second sub-light source module 120b may include a plurality of second light sources 121b, a second PCB 122b, and a second heat-dissipation plate 123b. The elements already described above with respect to the first sub-light source module 120a will not be described again.

In an exemplary embodiment, the plurality of second light sources 121b may be light-emitting diodes ("LEDs") emitting light having the first peak wavelength c1. That is, the plurality of second light sources 121b may be blue LEDs. The plurality of second light sources 121b may be arranged along the other side of the light guide plate 110. The plurality of first light sources 121a and the plurality of second light sources 121b may be symmetric with each other with respect to the light guide plate 110.

The reflective sheet 130 may be disposed under the light guide plate 110. The reflective sheet 130 may reflect the light exiting from the lower surface of the light guide plate 110 back to the light guide plate 110. Herein, spatially relative terms, such as "below", "beneath", "lower", "above" and "upper", may be defined as illustrated in the FIG. 2A. The reflective sheet 130 may include a plastic material. In an exemplary embodiment of the invention, the reflective sheet 130 may include polyethylene terephthalate ("PET") or polycarbonate ("PC"), for example.

The middle mold 140 may be disposed between the display panel 200 and the backlight unit 100. The middle mold 140 may be, for example, a rectangular frame having an opening therein. The middle mold 140 may be disposed under the display panel 200 to support the display panel 200. In addition, the middle mold 140 may support the optical sheet 150. The shape of the middle mold 140 is not limited to that shown in FIG. 2A. In another exemplary embodiment, the middle mold 140 may be omitted.

The optical sheet 150 may be disposed on the light guide plate 110. The optical sheet 150 may be disposed between the light guide plate 110 and the display panel 200. In an exemplary embodiment, the optical sheet 150 may include a diffusion sheet 151 and a prism sheet 152. The diffusion sheet 151 may diffuse the light provided from the light guide plate 110 and provide the diffused light to the display panel 200. The prism sheet 152 may be disposed on the diffusion sheet 151. The prism sheet 152 may concentrate the light diffused by the diffusion sheet 151 in a direction substantially perpendicular to the lower surface of the display panel 200. To this end, in an exemplary embodiment, the prism sheet 152 may include a plurality of prism patterns.

The optical sheet 150 may further include a protective sheet (not shown). The protective sheet may be disposed on the prism sheet 152 and may protect the prism sheet 152 from foreign matter such as dust.

The bottom chassis 160 may be coupled with a top chassis 300 to be described below. In an exemplary embodiment, the bottom chassis 160 may include a thermally conductive material. In an exemplary embodiment of the invention, the display device may further include a top chassis 300. The top chassis 300 may be disposed on the display panel 200. The top chassis 300 may surround the periphery of the display panel 200 and may be coupled with the bottom chassis 160.

In an exemplary embodiment, the display panel 200 may be a liquid-crystal display panel, for example. In the following description, it is assumed that the display panel 200 is a liquid-crystal display panel. The display panel 200 may include a first display plate 210 and a second display plate 220 disposed such that they face each other. A liquid-crystal layer 230 (refer to FIG. 3) may be disposed between the first display plate 210 and the second display plate 220. The display panel 200 may display an image by using the first light L1 provided from the backlight unit 100.

Referring to portion A of the second display plate 220 as shown in FIGS. 2A and 2D, the first transmissive layer PR1, the second transmissive layer PR2, the first wavelength conversion layer WC1, the first filter GC and the second filter BC may be disposed on the second display plate 220. This will be described below in more detail with reference to FIG. 3.

Figure 3:
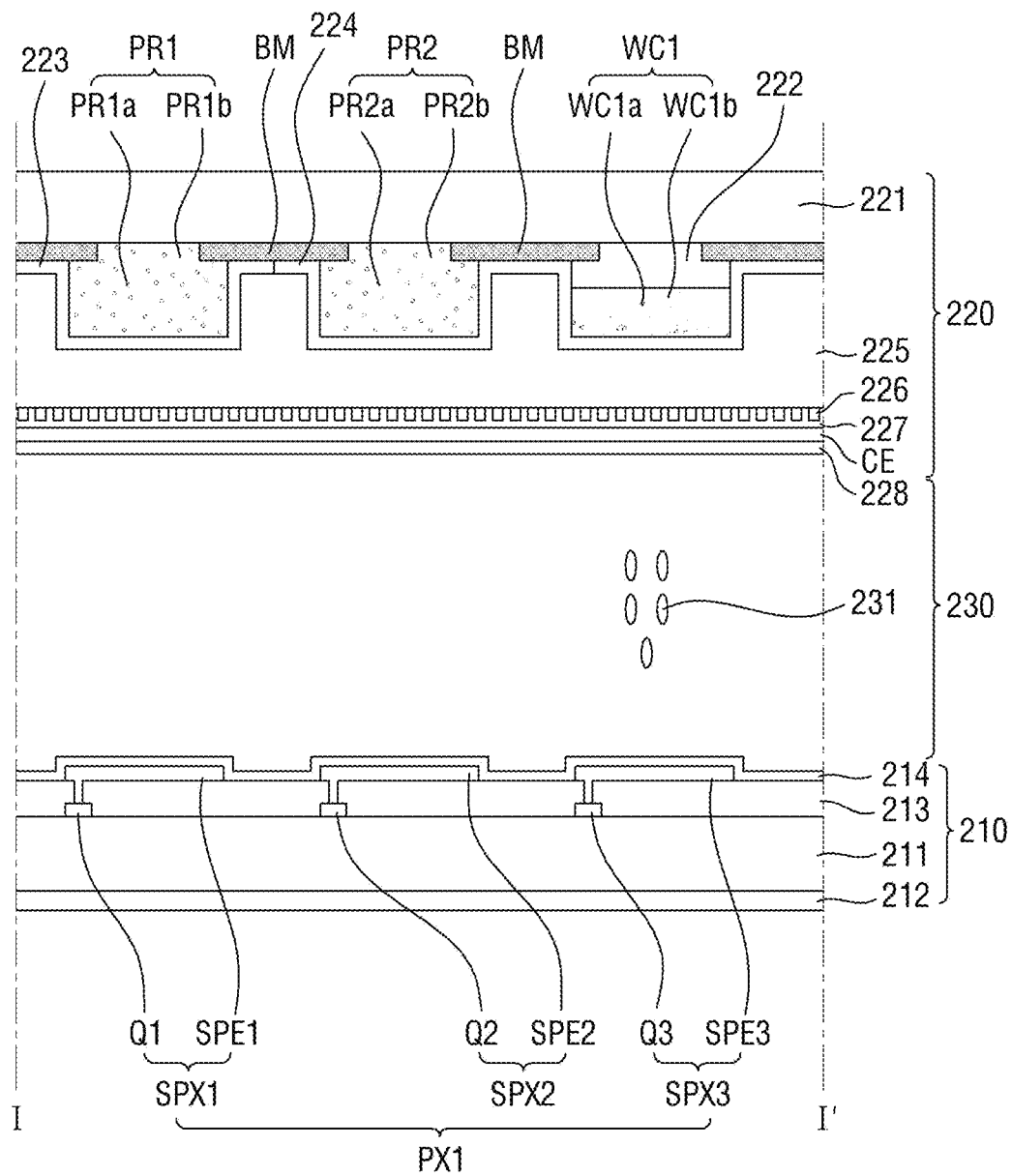
FIG. 3 is a cross-sectional view taken along line I-I' shown in FIG. 2A.
Figure 4:
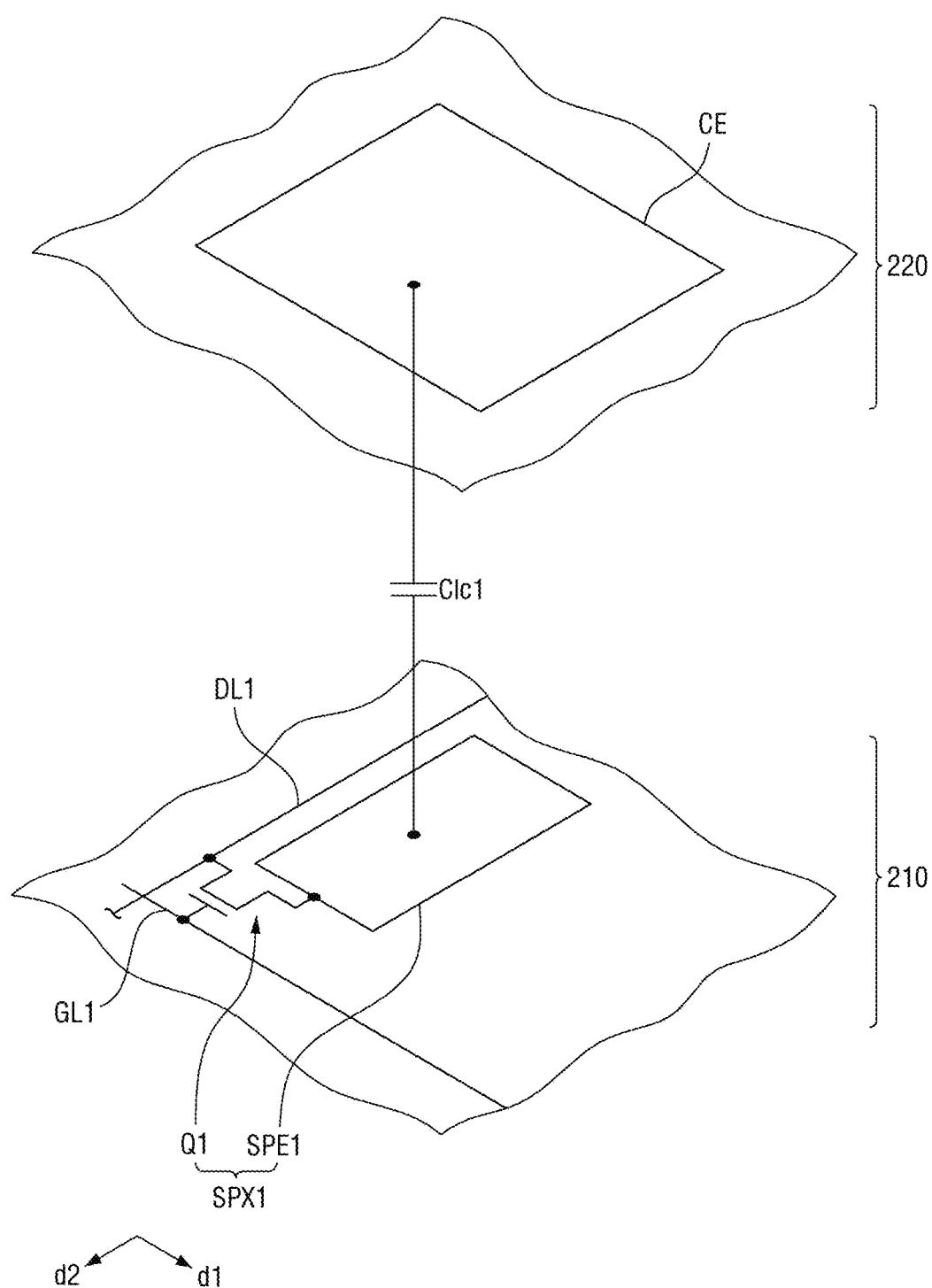
FIG. 4 is a view showing an example of a first sub-pixel shown in FIG. 3.

FIG. 3 is a cross-sectional view taken along line I-I' shown in FIG. 2A. FIG. 4 is a view showing an example of a first sub-pixel shown in FIG. 3.

Referring to FIGS. 2A to 4, the first display plate 210 may be disposed such that the first display plate 210 faces the second display plate 220. The liquid-crystal layer 230 may be interposed between the first display plate 210 and the second display plate 220 and may include a plurality of liquid-crystal molecules 231. In an exemplary embodiment, the first display plate 210 and the second display plate 220 may be attached together by sealing.

The first display plate 210 will be described first.

In an exemplary embodiment, a first substrate 211 may be a transparent insulation substrate. In an exemplary embodiment, the transparent insulation substrate may include a glass substrate, a quartz substrate, a transparent resin substrate, etc.

A first polarizing layer 212 may be disposed under the first substrate 211. Herein, spatially relative terms such as "under" may be defined as illustrated in the FIG. 3. The first substrate 211 may include a surface facing the second substrate 221 and the other surface opposed to the surface. In an exemplary embodiment, the first polarizing layer 212 may be disposed under the other surface of the first substrate 211. The first polarizing layer 212 may transmit polarized components of the first light L1 parallel to the transmission axis provided from the backlight unit 100, and may absorb or reflect the remaining components of the light. The first polarizing layer 212 may include an organic material or an inorganic material. In an exemplary embodiment, the first polarizing layer 212 may be a reflective polarizing layer.

In another exemplary embodiment, the first polarizing layer 212 may be disposed on the first substrate 211. That is, the first polarizing layer 212 may be disposed between the first substrate 211 and an insulation layer 213 to be described below.

A plurality of pixels including a first pixel PX1 may be disposed on the first substrate 211. The first pixel PX1 may include first to third sub-pixels SPX1 to SPX3.

The first sub-pixel SPX1 may include a first switching element Q1 and a first sub-pixel electrode SPE1 electrically connected to the first switching element Q1. The second sub-pixel SPX2 may include a second switching element Q2 and a second sub-pixel electrode SPE2 electrically connected to the second switching element Q2. The third sub-pixel SPX3 may include a third switching element Q3 and a third sub-pixel electrode SPE3 electrically connected to the third switching element Q3. The first to third sub-pixel electrodes SPE1 to SPE3 may be adjacent to one another.

The switching elements and the sub-pixel electrodes will be described in more detail with respect to the first sub-pixel SPX1 with reference to FIG. 4.

Referring to FIG. 4, in an exemplary embodiment, the first switching element Q1 may be an element having three terminals such as a thin-film transistor. A control electrode of the first switching element Q1 may be electrically connected to a first scan line GL1, and another electrode of the first switching element Q1 may be electrically connected to a first data line DL1. The other electrode of the first switching element Q1 may be electrically connected to the first sub-pixel electrode SPE1. In an exemplary embodiment, the first scan line GL1 may be extended in a first direction d1. In an exemplary embodiment, the first data line DL1 may be extended in a second direction d2 different from the first direction d1. In an exemplary embodiment, the first direction d1 may intersect the second direction d2.

The first switching element Q1 may be turned on upon receiving a scan signal from the first scan line GL1 and may provide a data signal received from the first data line DL1 to the first sub-pixel electrode SPE1. The first sub-pixel electrode SPE1 may at least partially overlap with a common electrode CE to be described below. Although the first sub-pixel SPX1 includes the first switching element Q1 only in this exemplary embodiment, the invention is not limited thereto. In other exemplary embodiments, the first sub-pixel SPX1 may include two or more switching elements, for example.

In an exemplary embodiment, the first sub-pixel SPE1 may be disposed on the first display plate 210. More specifically, the first sub-pixel electrode SPE1 may be disposed on the insulating layer 213 (refer to FIG. 3) located on the first substrate 211. In an exemplary embodiment, the common electrode CE may be disposed on the second display plate 2. The first sub-pixel electrode SPE1 may overlap with the common electrode CE at least partially. Accordingly, the first sub-pixel SPX1 may further include a first liquid-crystal capacitor Clc1 provided as the first sub-pixel electrode SPE1 and the common electrode CE overlap with each other. As used herein, the phrase "two elements overlap with each other" means that the two elements overlap with each other in the vertical direction with respect to the first substrate 211.

Referring back to FIG. 3, the insulating layer 213 may be disposed over the first to third switching elements Q1 to Q3. In an exemplary embodiment, the insulating layer 213 may include an inorganic insulation material such as silicon nitride and silicon oxide. In another exemplary embodiment, the insulating layer 213 may include an organic material that is suitable for a flat surface and has photosensitivity. The insulating layer 213 may include a plurality of contact holes for electrically connecting the first to third switching elements Q1 to Q3 with the first to third sub-pixel electrodes SPE1 to SPE3, respectively.

The first to third sub-pixel electrodes SPE1 to SPE3 may be disposed on the insulating layer 213. In an exemplary embodiment, the first to third sub-pixel electrodes SPE1 to SPE3 may include a transparent conductive material such as indium tin oxide ("ITO") and indium zinc oxide ("IZO") or a reflective metal such as aluminum, silver, chrome or an alloy thereof. Each of the first to third sub-pixel electrodes SPE1 to SPE3 may overlap with the common electrode CE.

In addition, the first sub-pixel electrode SPE1 may overlap with the first transmissive layer PR1. The second sub-pixel electrode SPE2 may overlap with the second transmissive layer PR2. The third sub-pixel electrode SPE3 may overlap with the first wavelength conversion layer WC1. Detailed description thereof will be made below.

A first alignment layer 214 may be disposed on the first to third sub-pixel electrodes SPE1 to SPE3. In an exemplary embodiment, the first alignment layer 214 may include polyimide, etc.

Next, the second display plate 220 will be described.

The second substrate 221 may disposed such that the second substrate 221 faces the first substrate 211. The second substrate 221 may include transparent glass, plastic, etc., and in an exemplary embodiment, may include the same material as that of the first substrate 211.

A black matrix BM may be disposed on the second substrate 221. The black matrix BM may block transmission of light. In an exemplary embodiment, the black matrix BM may include an organic material or a metallic material including chrome, for example. Although the black matrix BM is included in the second display plate 220 herein, this is merely illustrative. In an exemplary embodiment, the black matrix BM may be included in the first display plate 210 as well, for example.

A third filter 222 may be disposed on at least some portions of the black matrix BM, and on some portions of the second substrate 221 where the black matrix BM is not disposed. The third filter 222 may at least partially overlap with the first wavelength conversion layer WC1 as will be described below. The third filter 222 will be described below in conjunction with the first wavelength conversion layer WC1.

The first transmissive layer PR1 may be disposed on at least some portions of the black matrix BM, and on some portions of the second substrate 221 where the black matrix BM is not disposed. The first transmissive layer PR1 may at least partially overlap with the first sub-pixel electrode SPE1.

The first transmissive layer PR1 may include a first light-scattering material PR1a and a first light-transmitting resin PR1b.

The first light-scattering material PR1a may be dispersed in the first light-transmitting resin PR1b. The first light-scattering material PR1a may scatter the light provided to the first transmissive layer PR1 so that the light exits. The first light-scattering material PR1a may scatter the light provided to the first transmissive layer PR1 in different directions irrespectively of the incident angle. The polarization of the exiting light may be cancelled such that the exiting light may be in an unpolarized state.

In an exemplary embodiment, the first light-scattering material PR1 a may have a refractive index different from that of the first light-transmitting resin PR1b. In an exemplary embodiment, the first light-scattering material PR1a may be one of $TiO_2$, $ZrO_2$, $Al_2O_3$, $In_2O_3$, $ZnO$, $SnO_2$, $Sb_2O_3$ and ITO, for example. However, this is merely illustrative, and any material capable of scattering incident light may be used.

The material of first light-transmitting resin PR1b is not particularly limited as long as it is a transparent medium that does not affect the light scattering of the first light-scattering material PR1a and does not cause light absorption. In an exemplary embodiment, the first light-transmitting resin PR1b may include epoxy, polystyrene, and acrylate, for example. The first light transmitting layer PR1 may include an organic solvent instead of the first light-transmitting resin PR1b. In an exemplary embodiment, the organic solvent may include toluene, chloroform, and ethanol, for example.

The second transmissive layer PR2 may be disposed on at least some portions of the black matrix BM, and on some portions of the second substrate 221 where the black matrix BM is not disposed. The second transmissive layer PR2 may at least partially overlap with the second sub-pixel electrode SPE2.

The second transmissive layer PR2 may include a second light-scattering material PR2a and a second light-transmitting resin PR2b.

The second light-scattering material PR2a may be dispersed in the second light-transmitting resin PR2b. The second light-scattering material PR2a may scatter the light provided to the second transmissive layer PR2 so that the light exits. The second light-scattering material PR2a may scatter the light provided to the second transmissive layer PR2 in different directions irrespectively of the incident angle. The emitted light may be unpolarized, i.e., in an unpolarized state.

In an exemplary embodiment, the second light-scattering material PR2a may have a refractive index different from that of the second light-transmitting resin PR2b. In an exemplary embodiment, the second light-scattering material PR2a may be one of $TiO_2$, $ZrO_2$, $Al_2O_3$, $In_2O_3$, $ZnO$, $SnO_2$, $Sb_2O_3$ and ITO, for example. However, this is merely illustrative, and any material capable of scattering incident light may be used.

In an exemplary embodiment, the second light-transmitting resin PR1b may include the same medium as that of the first light-transmitting resin PR1a.

The first wavelength conversion layer WC1 may be disposed on the third filter 222. The first wavelength conversion layer WC1 may at least partially overlap with the third sub-pixel electrode SPE3.

The first wavelength conversion layer WC1 may convert or shift the peak wavelength of the light provided to the first wavelength conversion layer WC1. More specifically, the first wavelength conversion layer WC1 may include a first wavelength-converting material WC1a and a third light-transmitting resin WC1b.

The first wavelength-converting material WC1a may be dispersed in the third light-transmitting resin WC1b. The first wavelength-converting material WC1a may convert or shift the light provided to the first wavelength conversion layer WC1 to light having the third peak wavelength c3 (refer to FIG. 1C).

In an exemplary embodiment, the first wavelength-converting material WC1a may include first quantum dots. The particle size of the first quantum dots is not particularly limited as long as the first wavelength-converting material WC1 a may convert the light received from the outside into the light having the third peak wavelength c3.

The first quantum dots may include group II-VI compounds, group III-V compounds, group IV-VI compounds, group IV elements, group IV compounds, and a combination thereof.

In an exemplary embodiment, the group II-VI compounds may include binary compounds including CdSe, CdTe, ZnS, ZnSe, ZnTe, ZnO, HgS, HgSe, HgTe, MgSe, MgS and a combination thereof, ternary compounds including CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and a combination thereof, and quaternary compounds including HgZnTeS, CdZnSeS, CdZnSeTe, CdZnSTe, CdHgSeS, CdHgSeTe, CdHgSTe, HgZnSeS, HgZnSeTe, HgZnSTe and a combination thereof.

In an exemplary embodiment, the group III-V compounds may include binary compounds including GaN, GaP, GaAs, GaSb, AlN, AlP, AlAs, AlSb, InN, InP, InAs, InSb and a combination thereof, ternary compounds including GaNP, GaNAs, GaNSb, GaPAs, GaPSb, AlNP, AlNAs, AlNSb, AlPAs, AlPSb, InNP, InNAs, InNSb, InPAs, InPSb, GaAlNP and a combination thereof, and quaternary compounds including GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and a combination thereof.

In an exemplary embodiment, the group IV-VI compounds may include binary compounds including SnS, SnSe, SnTe, PbS, PbSe, PbTe and a combination thereof, ternary compounds including SnSeS, SnSeTe, Snالسلم, PbSeS, PbSeTe, PbSTe, SnPbS, SnPbSe, SnPbTe and a combination thereof, and quaternary compounds including SnPbSSe, SnPbSeTe, SnPbSTe and a combination thereof. The group IV elements may include Si, Ge and a combination thereof. The group IV compounds may be binary compounds including SiC, SiGe and a combination thereof.

The binary compounds, the ternary compounds or the quaternary compounds may be in the particles at a uniform concentration, or may be in the same particles at partially different concentrations. In addition, they may have a core/shell structure in which one quantum dot surrounds another quantum dot. The interface between the core and the shell may have a concentration gradient that the concentration of the element in the shell decreases toward the center.

In an exemplary embodiment, the first quantum dots may have a half-width of the emission wavelength spectrum of approximately 45 nm or less, preferably approximately 40 nm or less, more preferably approximately 30 nm or less, for example. Within the range, the color purity and color gamut may be improved. Also, the light emitted through the first quantum dots exits in all directions, so that a wide viewing angle may be improved.

In addition, in an exemplary embodiment, the first quantum dots may have a spherical shape, a pyramidal shape and a multi-arm shape, or may be cubic nanoparticles, nanotubes, nanowires, nanofibers, nano-platelets or the like.

In another exemplary embodiment, the first wavelength-converting material WC1a may include quantum rods or phosphor substance, as well as quantum dots. In an exemplary embodiment, the phosphor may have a size of approximately 100 nm to approximately 3,000 nm, for example. In an exemplary embodiment, the phosphor may include yellow, green, and red fluorescent materials.

That is, the first wavelength-converting material WC1a may change the peak wavelength of the light provided to the first wavelength conversion layer WC1 to emit light having the third peak wavelength c3. The first wavelength-converting material WC1a may scatter the light provided to the first wavelength conversion layer WC1 in different directions irrespectively of the incident angle.

The first wavelength-converting material WC1a may be dispersed and naturally coordinated in the third light-transmitting resin WC1b. The third light-transmitting resin WC1b is not particularly limited as long as it is a transparent medium that does not affect the wavelength conversion of the first wavelength-converting material WC1a and does not cause light absorption. In an exemplary embodiment, the third light-transmitting resin WC1b may include epoxy, polystyrene, and acrylate, for example. The first wavelength conversion layer WC1 may include an organic solvent instead of the third light-transmitting resin WC1b.

Incidentally, although the major of the light provided to the first wavelength conversion layer WC1 is converted into the light having the third peak wavelength c3 by the first wavelength-converting material WC1a, some of the light provided to the first wavelength conversion layer WC1 may fail to meet the first wavelength-converting material WC1a. When this happens, the light provided to the first wavelength conversion layer WC1 and the light having the third peak wavelength c3 may be mixed with each other to cause color mixture. In this regard, the third filter 222 blocks the light having the peak wavelength unchanged even after having passed through the first wavelength conversion layer WC1, thereby preventing color mixture and improving color purity.

The first filter GC (refer to FIG. 1A) may at least partially overlap with the first transmissive layer PR1. In an exemplary embodiment, the first filter GC (refer to FIG. 1A) may be a green cut-off filter. Hereinafter, in FIG. 3, the first filter GC (refer to FIG. 1A) will be described as a green cut-off filter 223.

The green cut-off filter 223 transmits light having the first peak wavelength c1 and blocks light having the second peak wavelength c2. That is, the green cut-off filter 223 may transmit blue light and may block green light. By doing so, it is possible to prevent green light from exiting through the first transmissive layer PR1. In an exemplary embodiment, the green cut-off filter 223 may surround the first transmissive layer PR1. The green cut-off filter 223 may include either a single film or multiple films.

The second filter BC (refer to FIG. 1A) may at least partially overlap with the second transmissive layer PR2. In an exemplary embodiment, the second filter BC (refer to FIG. 1A) may be a blue cut-off filter. Hereinafter, in FIG. 3, the second filter BC (refer to FIG. 1A) will be described as a blue cut-off filter 224.

The blue cut-off filter 224 blocks the light having the first peak wavelength c1 and transmits the light having the second peak wavelength c2. That is, the blue cut-off filter 224 may block blue light and may transmit green light. By doing so, it is possible to prevent blue light from exiting through the second transmissive layer PR2. In an exemplary embodiment, the blue cut-off filter 224 may surround the second transmissive layer PR2. The blue cut-off filter 224 may include either a single film or multiple films.

In an exemplary embodiment, the blue cut-off filter 224 may also be disposed on the first wavelength conversion layer WC1. In an exemplary embodiment, the blue cut-off filter 224 may surround the first wavelength conversion layer WC1. The blue cut-off filter 224 may reflect the light having the third peak wavelength c3. That is, the blue cut-off filter 224 may reflect red light.

An example of the blue cut-off filter 224 will described. The blue cut-off filter 224 may block the light having the first peak wavelength c1 and transmit the light having the second peak wavelength c2 in the first light L1. That is, the blue cut-off filter 224 may transmit green light. Therefore, green light may be provided to the first wavelength conversion layer WC1. The green light provided to the first wavelength conversion layer WC1 may be converted into red light by converting the peak wavelength by the first wavelength-converting material WC1a.

Although the converted red light may exit, some of the converted red light may propagate toward the first display plate 210. The blue cut-off filter 224 may reflect the some of the red light back to the second substrate 221. In this manner, the light output efficiency of the light may be improved.

However, the invention is not limited thereto, and it is to be noted that the green cut-off filter 223 may be disposed on the first wavelength conversion layer WC1, unlike the one shown in FIG. 3.

A planarization layer 225 may be disposed on the green cut-off filter 223 and the blue cut-off filter 224. In an exemplary embodiment, the planarization layer 225 may include an organic material. The planarization layer 225 may make the height of the components stacked on one surface of the second substrate 221 uniform.

A second polarizing layer 226 may be disposed on the planarization layer 225. In an exemplary embodiment, the second polarizing layer 226 may include a conductive material that allows electric current to flow. In an exemplary embodiment, the conductive material may include a metal including aluminum (Al), silver (Ag), gold (Au), copper (Cu) and nickel (Ni), for example. In an exemplary embodiment, the conductive material may further include titanium (Ti) and molybdenum (Mo), for example.

In an exemplary embodiment, the second polarizing layer 226 may be a wire grid polarizer. Accordingly, the second polarizing layer 226 may include a plurality of line grid patterns protruding toward the first substrate 211. In an exemplary embodiment, the second polarizing layer 226 may include aluminum, silver, copper, nickel, etc.

In an exemplary embodiment, after the incident light passes through the second polarizing layer 226, components in parallel with the second polarizing layer 226 may be absorbed or reflected, and only vertical components are transmitted such that polarized light may be produced, for example. It is to be noted that a larger gap between the line grid patterns of the second polarizing layer 226 may achieve more efficient polarization. In an exemplary embodiment, the second polarizing layer 226 may be provided by nanoimprinting or the like.

Although not shown in the drawings, an additional insulating layer may be disposed between the planarization layer 225 and the second polarizing layer 226. In an exemplary embodiment, the additional insulating layer may include an inorganic insulating material such as silicon nitride and silicon oxide, for example.

A capping layer 227 may be disposed on the second polarizing layer 226. The capping layer 227 may suppress defects such as corrosion of the second polarizing layer 226 and may provide a flat upper surface over the second polarizing layer 226.

The common electrode CE may be disposed on the capping layer 227. The common electrode CE may overlap at least a part of each of the first to third sub-pixel electrodes SPE1 to SPE3. In an exemplary embodiment, the common electrode CE may be a single, continuous electrode. In an exemplary embodiment, the common electrode CE may include a transparent conductive material such as ITO and IZO or a reflective metal such as aluminum, silver, chrome or an alloy thereof.

A second alignment layer 228 may be disposed on the common electrode CE. In an exemplary embodiment, the second alignment layer 228 may include polyimide, etc.

Hereinafter, the liquid-crystal layer 230 will be described.

The liquid-crystal layer 230 may include a number of liquid-crystal molecules 231. In an exemplary embodiment, the liquid-crystal molecules 231 may have negative dielectric anisotropy, for example. When no electric filed is applied across the liquid-crystal layer 230, the liquid-crystal molecules 231 may be orientated in a direction perpendicular to the first substrate 211. When electric field is generated between the first substrate 211 and the second substrate 221, the liquid-crystal molecules 231 may be rotated or tilted in a particular direction to thereby change the polarization of light provided to the liquid-crystal layer 230.

Figure 5:
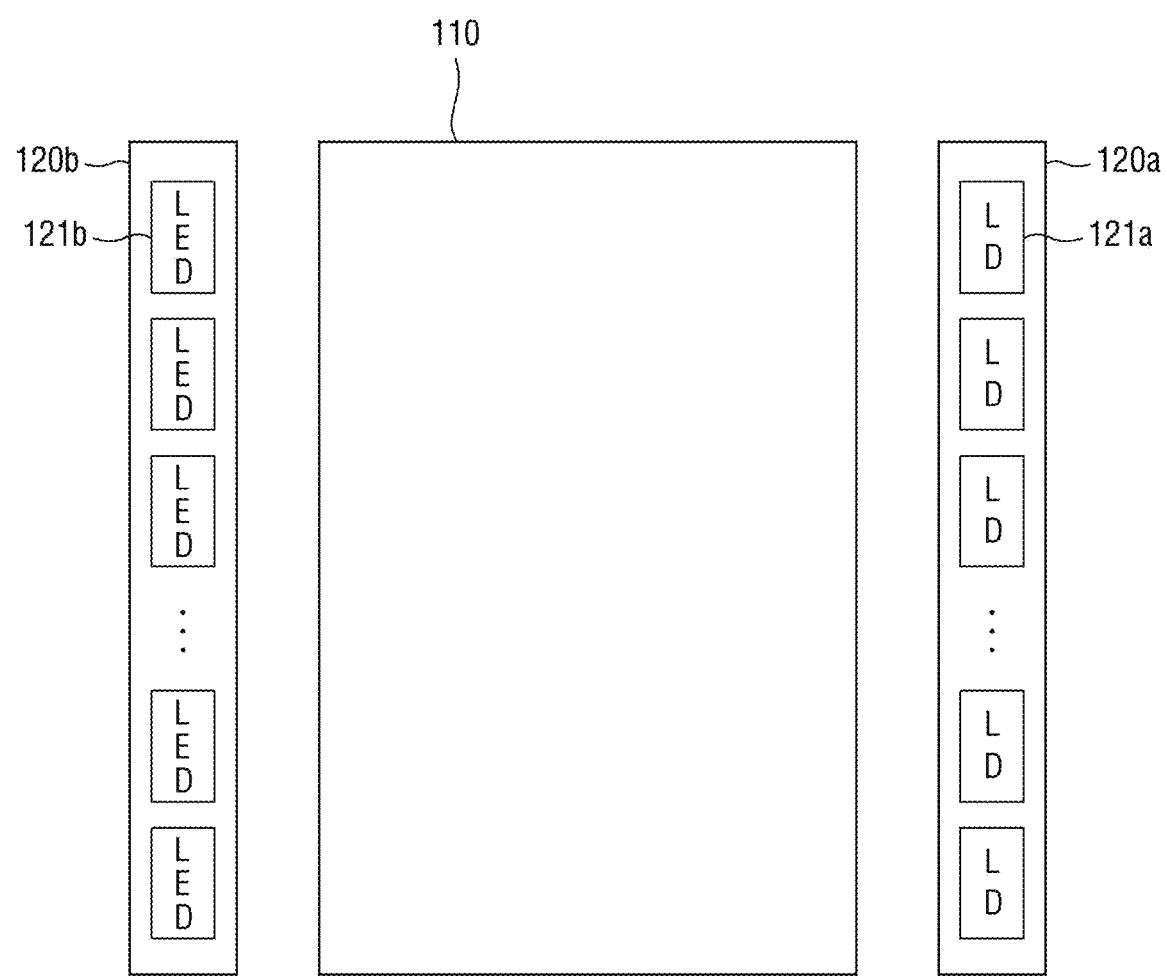
FIG. 5 is a plan view of the exemplary embodiment of some elements of the backlight unit shown in FIG. 2A according to the invention.

FIG. 5 is a plan view of some elements of the backlight unit shown in FIGS. 2A to 2D according to the exemplary embodiment of the invention.

Referring to FIG. 5, the backlight unit 100 may include a first light source unit 120a and a second light source unit 120b. In an exemplary embodiment, the first light source unit 120a may include a plurality of first light sources 121a. The plurality of first light sources 121a may be green laser diodes LDs emitting light having the second peak wavelength c2. That is, the plurality of first light sources 121a may emit green light having the second peak wavelength c2 toward one side of the light guide plate 110.

In an exemplary embodiment, the second light source unit 120b may include a plurality of second light sources 121b. The plurality of second light sources 121b may be blue laser diodes ("LEDs") emitting light having the first peak wavelength c1. That is, the plurality of second light sources 121b may emit blue light having the first peak wavelength c1 toward the other side of the light guide plate 110.

It is to be noted that the number, arrangement and shape of each of the plurality of first light sources 121a and the plurality of second light sources 121b are not limited to those shown in FIG. 5.

Figure 6A:
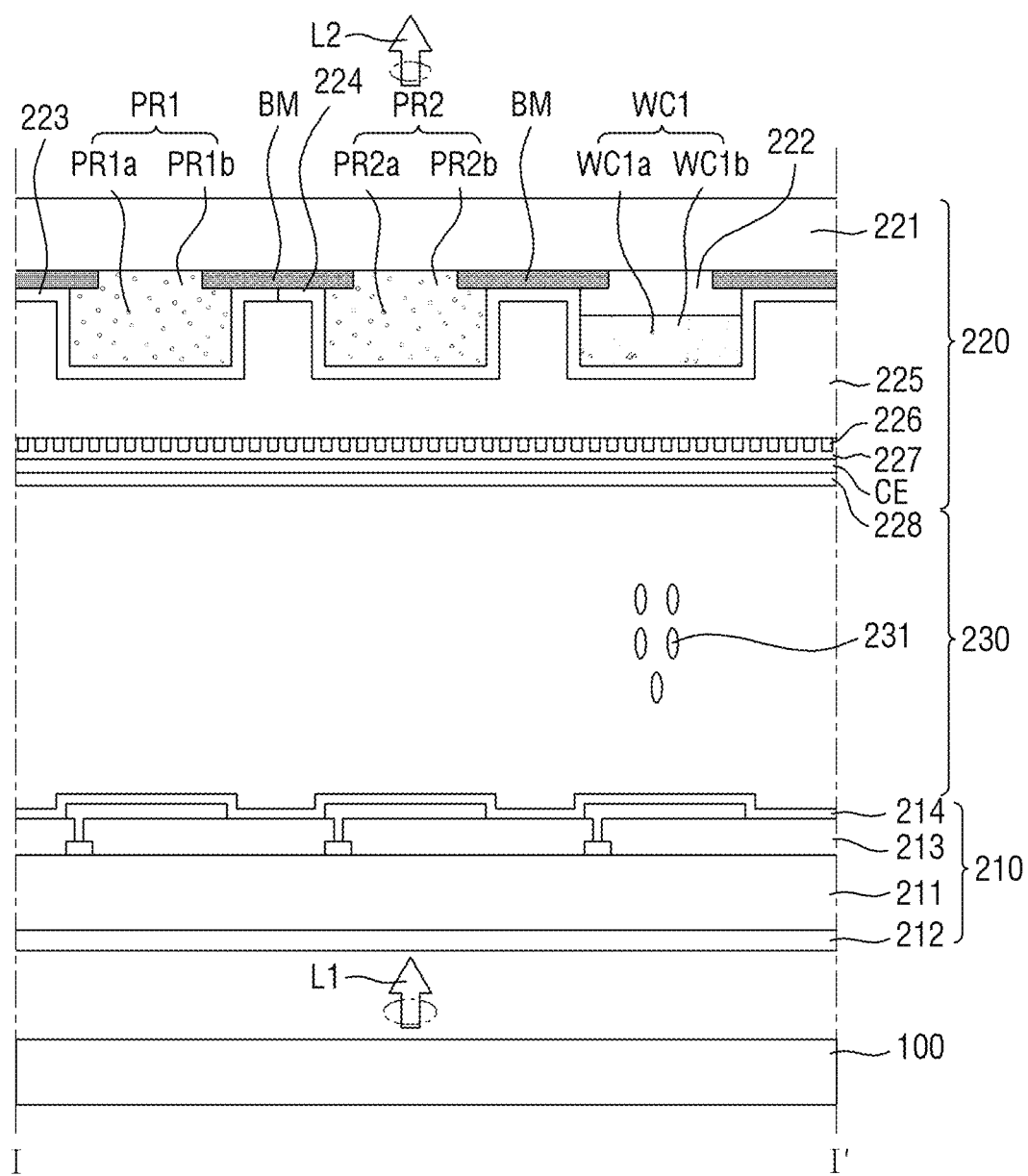
FIG. 6A is a cross-sectional view showing the exemplary embodiment of the display device.
Figure 6B:
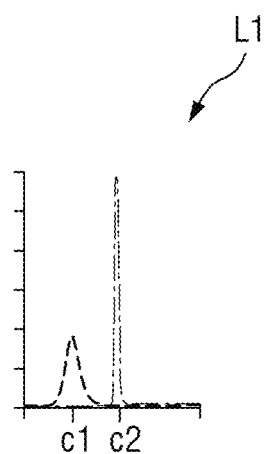
FIGS. 6B and 6C are wavelength graphs of the first light and the second light of the exemplary embodiment of the display device.
Figure 6C:
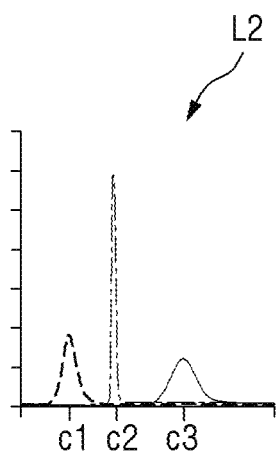

FIG. 6 is a cross-sectional view showing in more detail a display device according to an exemplary embodiment of the invention, and FIGS. 6B and 6C are wavelength graphs of the first light and the second light of the exemplary embodiment of the display device. Referring to FIGS. 6A to 6C, the display device according to the exemplary embodiment of the invention will be described along an optical path. It is assumed that the intensity of the first light L1 emitted from the backlight unit 100 and the intensity of the second light L2 emitted from the display panel 200 (refer to FIG. 1A and FIG. 2A) are substantially equal to each other.

First, the backlight unit 100 may provide the first light L1 to the lower display plate 210, more specifically, the first polarizing layer 212. The first light L1 may be a combination of light having the first peak wavelength c1 and light having the second peak wavelength c2. As described above, the backlight unit 100 may include blue LEDs (refer to FIG. 5) that emit light having the first peak wavelength c1. In addition, the backlight unit 100 may include green laser diodes LDs (refer to FIG. 5) that emit light having the second peak wavelength c2. The second peak wavelength c2 has a relatively narrow range of peak wavelength by the green laser diodes LDs. In an exemplary embodiment, the first light L1, in which light having the first peak wavelength c1 and light having the second peak wavelength c2 are mixed, may be cyan light.

The polarized components of the first light L1 provided to the first polarizing layer 212, which are parallel to the transmission axis of the first polarizing layer 212, may transmit the first polarizing layer 212. The light transmitted the first polarizing layer 212 may be provided to the second display plate 220.

The first transmissive layer PR1 will be described first. The light having the second peak wavelength c2 of the light provided to the second display plate 220 may be blocked by the green cut-off filter 223. The light having the first peak wavelength c1 of the light provided to the second display plate 220 may transmit the green cut-off filter 223 to be provided to the first transmissive layer PR1. That is, blue light may be provided to the first transmissive layer PR1. The blue light provided to the first transmissive layer PR1 may be scattered by the first light-scattering material PR1a to exit.

For the second transmissive layer PR2, the light having the first peak wavelength c1 of the light provided to the second display plate 220 may be blocked by the blue cut-off filter 224. The light having the second peak wavelength c2 of the light provided to the second display plate 220 may transmit the blue cut-off filter 224 to be provided to the second transmissive layer PR2. That is, green light may be provided to the second transmissive layer PR2. The green light provided to the second transmissive layer PR2 may be scattered by the second light-scattering material PR2a to exit.

For the first wavelength conversion layer WC1, the light having the first peak wavelength c1 of the light provided to the second display plate 220 may be blocked by the blue cut-off filter 224. The light having the second peak wavelength c2 of the light provided to the second display plate 220 may transmit the blue cut-off filter 224 to be provided to the first wavelength conversion layer WC1. That is, green light may be provided to the first wavelength conversion layer WC1. The light having the second peak wavelength c2 provided to the first wavelength conversion layer WC1 may be converted into the light having the third peak wavelength c3 by the first wavelength converting material WC1a. That is, the green light may be converted into red light.

The first wavelength-converting material WC1a may scatter the red light in different directions irrespectively of the incident angle, such that the red light exits. Some of the light that exits toward the first display plate 210 may be reflected by the blue cut-off filter 224 back to the second substrate 221. Incidentally, the third filter 222 blocks the light having the peak wavelength unchanged even after having passed through the first wavelength conversion layer WC1, thereby preventing color mixture and improving color purity.

The second light L2 may be a combination of the blue light exiting the first transmissive layer PR1, the green light exiting the second transmissive layer PR2, and the red light exiting the first wavelength conversion layer WC1.

Figure 7:
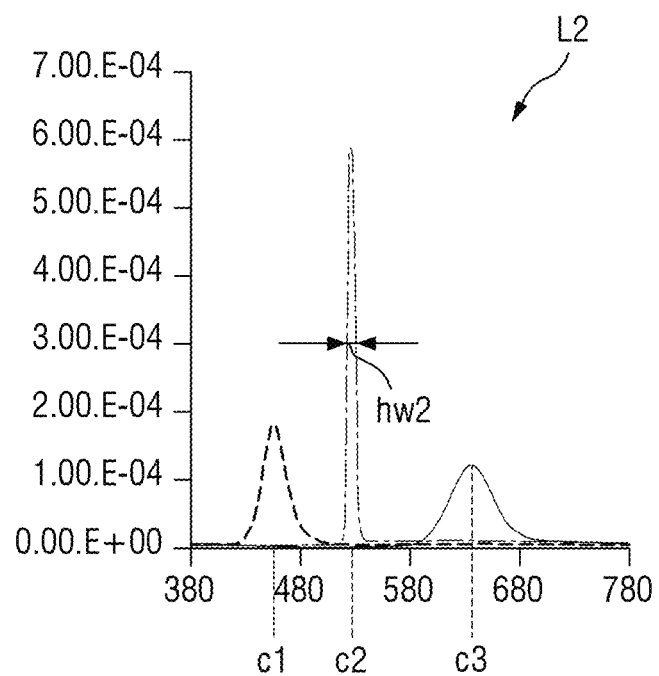
FIG. 7 is a graph showing the spectrum of light exiting an exemplary embodiment of a display device according to the invention.
Figure 8:
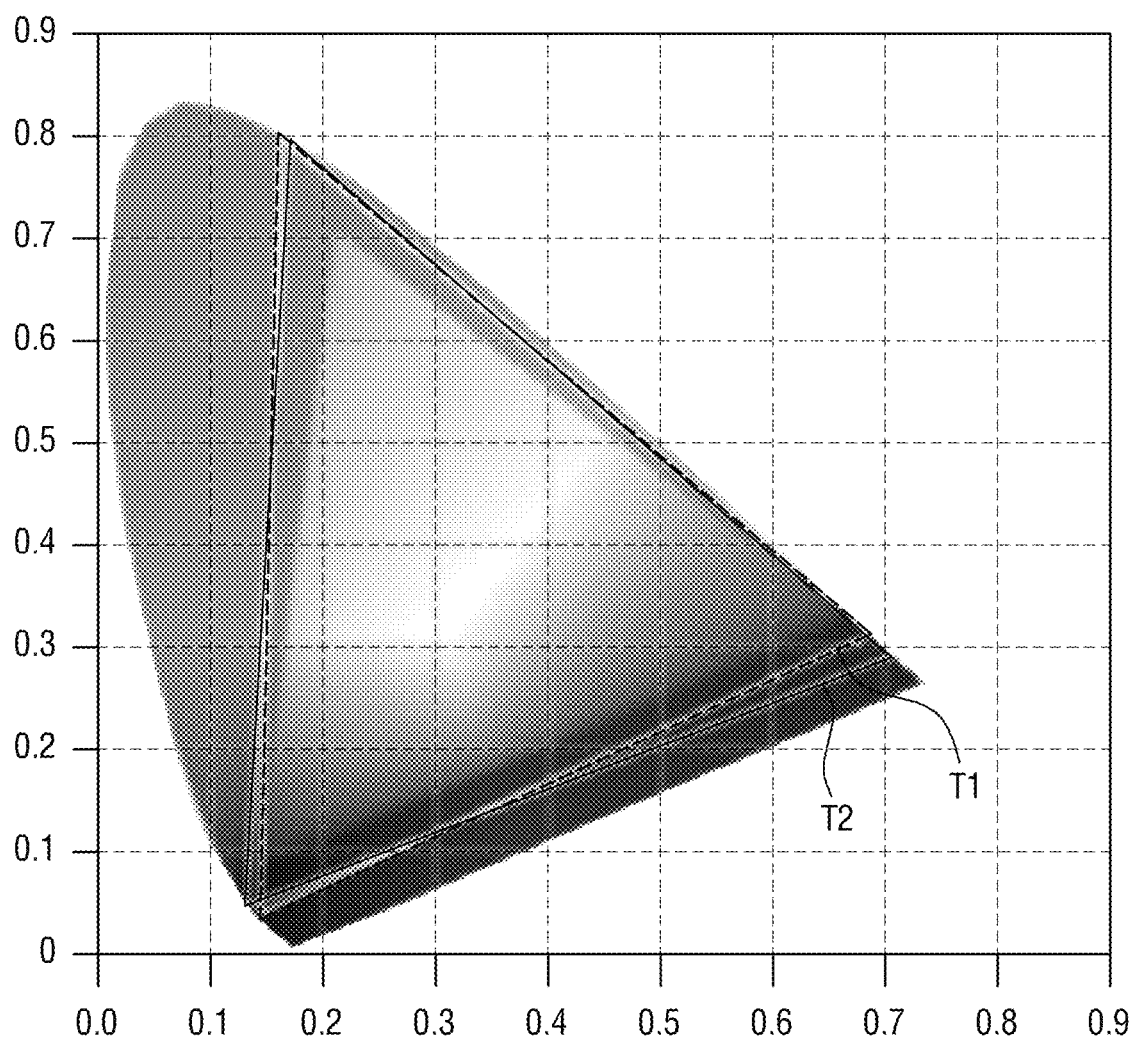
FIG. 8 is a chromaticity diagram for illustrating effects achieved by the exemplary embodiment of the display device according to the invention.

FIG. 7 is a graph showing the spectrum of light exiting a display device according to an exemplary embodiment of the invention. FIG. 8 is a chromaticity diagram for illustrating effects achieved by the display device according to the exemplary embodiment of the invention. The light exiting the display device corresponds to the second light L2 in FIG. 6. A first triangle T1 in FIG. 8 represents the color gamut defined by BT. 2020. A second triangle T2 in FIG. 8 represents the color gamut of the display device according to the exemplary embodiment of the invention. BT. 2020 is the ITU recommendation defining various features of the 4K/Ultra high-definition television ("UHD TV"). Specifically, a triangle has higher color gamut as it is closer to the first triangle T1 representing the color gamut of BT. 2020.

Referring to FIGS. 7 and 8, the second light L2 may be a combination of light having the first peak wavelength c1, light having the second peak wavelength c2 and light having the third peak wavelength c3.

The second peak wavelength c2 may range from approximately 528 nm to approximately 534 nm, for example. The light having the second peak wavelength c2 is emitted by the above-described laser diodes LDs. Accordingly, the half-width of the light having the second peak wavelength c2 may be narrower than the half-width of the light having the first peak wavelength c1. More specifically, the half-width of the light having the second peak wavelength c2 may be approximately 2 nm, for example.

Table 1 below shows the evaluation of the color gamuts of an exiting display device and a display device according to an exemplary embodiment of the invention with respect to the color gamut defined by BT. 2020 in %. The exiting display device in Table 2 is defined as a device having a backlight unit including LEDs and a display panel with typical color filters. The devices are evaluated by comparing the color gamut of each of the devices with the color gamut of BT. 2020 based on how close the triangles are to the first triangle T1 shown in FIG. 8.

TABLE 1

|  | BT. 2020 |
| --- | --- |
| Existing Display Device | 54.7% |
| Device according to Exemplary Embodiment | 95.1% |

Referring to FIG. 8 and Table 1, the display device according to the exemplary embodiment of the invention exhibited the color gamut of approximately 95.1% with respect to the color gamut of BT. 2020. In contrast, the existing display device exhibited the color gamut of approximately 54.1% with respect to the color gamut of BT. 2020. Accordingly, it may be seen that the color gamut of the display device according to the exemplary embodiment of the invention has been improved as compared with the existing display device.

That is, in the display device according to the exemplary embodiment of the invention, the light emitted from the backlight unit 100 having the laser diodes LDs are provided to the display panel 200 having the first wavelength conversion layer WC1, such that the color gamut may be improved, which meets the requirements of BT. 2020.

Figure 9:
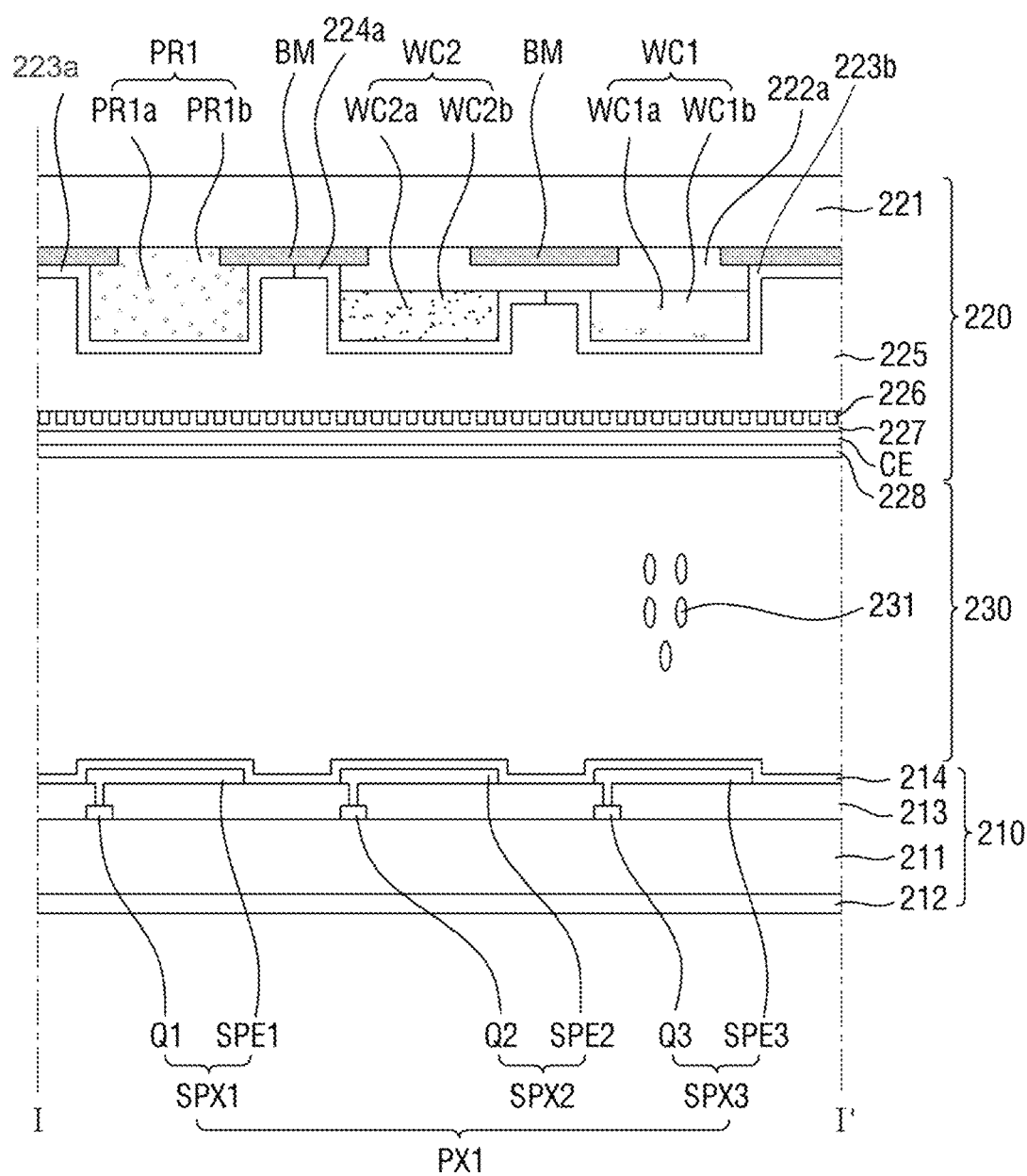
FIG. 9 is a cross-sectional view of another exemplary embodiment of a display device according to the invention.

FIG. 9 is a cross-sectional view of a display device according to another exemplary embodiment of the invention. The elements already described above with respect to FIGS. 1 to 8 will not be described again. It is to be noted that the green cut-off filter 223 described above with reference to FIG. 3 is denoted by reference numeral 223*a* in FIG. 9.

Referring to FIG. 9, a green cut-off filter 223*a* may overlap with a first transmissive layer PR1. A blue cut-off filter 224*a* may overlap with a second transmissive layer PR2. The display device according to the exemplary embodiment of the invention may further include a fourth filter 223*b*. The fourth filter 223*b* may surround the first wavelength conversion layer WC1.

The fourth filter 223*b* may transmit the first peak wavelength c1 and/or the second peak wavelength c2. Further, the fourth filter 223*b* may reflect light having the third peak wavelength c3. Accordingly, the fourth filter 223*b* reflects the light having the third peak wavelength c3 propagating from the first wavelength conversion layer WC1 toward the first substrate 211 back to the second substrate 221. In an exemplary embodiment, the peak wavelength of red light is converted in the first wavelength conversion layer WC1, and some of the red light that propagate toward the first substrate 211 is reflected by the fourth filter 223*b* so that it is directed back to the second substrate 221, for example. In this manner, the emission efficiency of the light exiting the first wavelength conversion layer WC1 may be improved.

The blue cut-off filter 224*a* blocks the light having the first peak wavelength c1 and transmits the light having the second peak wavelength c2. That is, the blue cut-off filter 224 may block blue light and may transmit green light.

Figure 10:
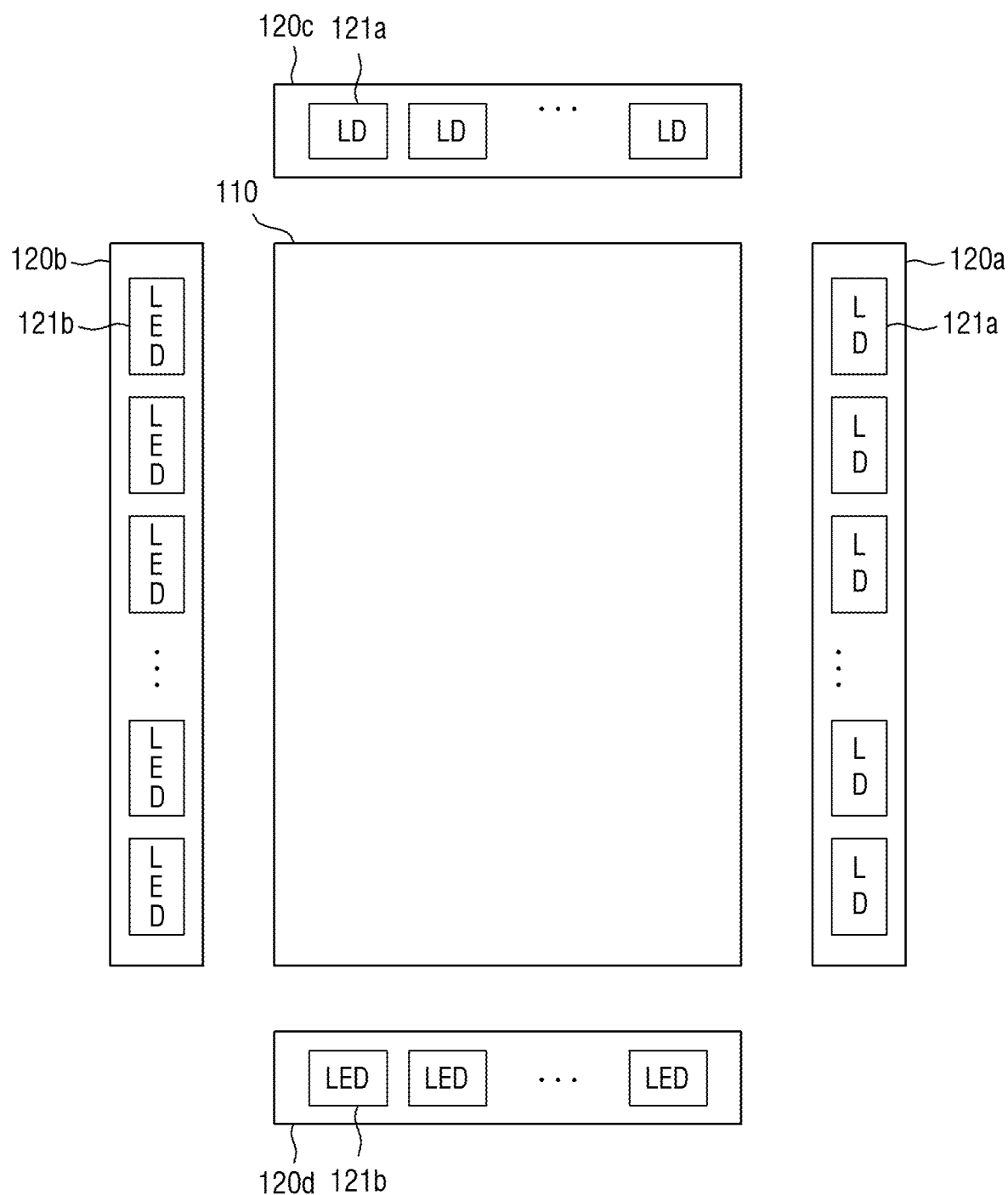
FIGS. 10 and 11 are plan views of another exemplary embodiment of some elements of the backlight unit shown in FIG. 2A according to the invention.
Figure 11:
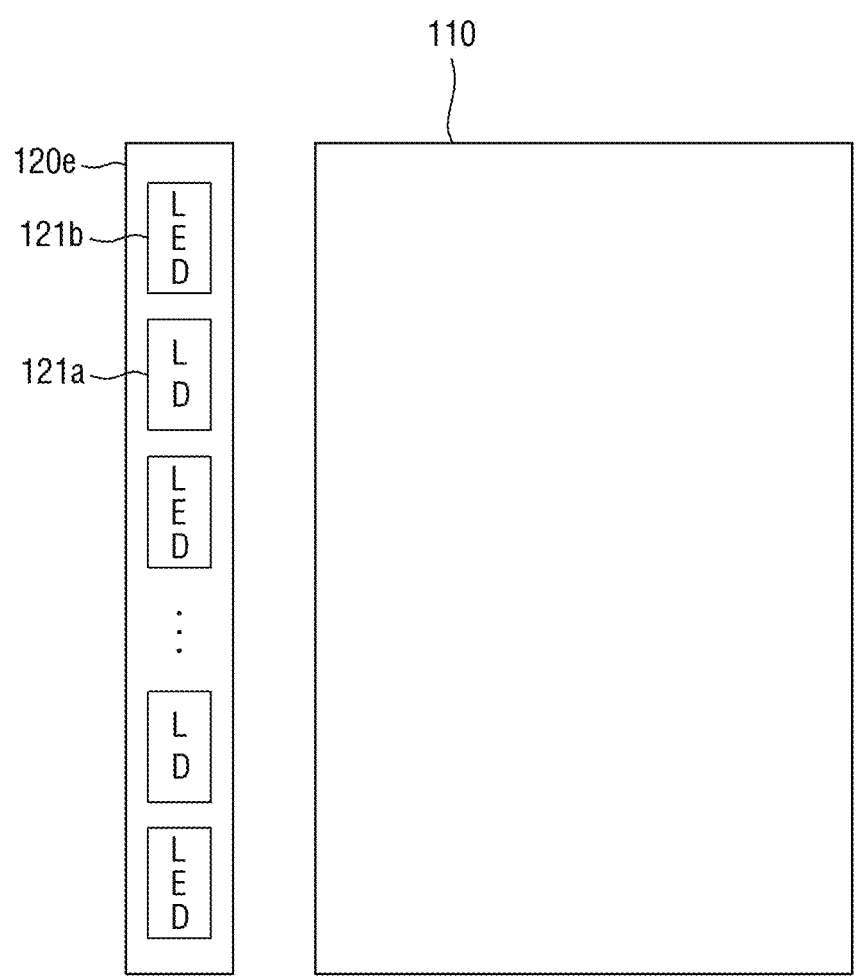

FIGS. 10 and 11 are plan views of some elements of the backlight unit shown in FIG. 2 according to another exemplary embodiment of the invention.

Referring to FIG. 10, the backlight unit 100 may further include a third light source unit 120*c* and a fourth light source unit 120*d*. The third light source unit 120*c* may further include a plurality of first light sources 121*a*. That is, the third light source unit 120*c* may include a plurality of green laser diodes LDs emitting light having the second peak wavelength c2. The fourth light source unit 120*d* may further include a plurality of second light sources 121*b*. That is, the fourth light source unit 120*d* may include a plurality of blue LEDs that emit light having the first peak wavelength c1. The arrangement, shape, and number of light sources of the first to fourth light source units 120*a* to 120*d* are not limited to those shown in FIG. 10.

Referring to FIG. 11, the backlight unit 100 may include a fifth light source unit 120*e*. The fifth light source unit 120*e* may include a plurality of first light sources 121*a* and a plurality of second light sources 121*b*. That is, the fifth light source unit 120*e* may include a plurality of green laser diodes LDs emitting light having the second peak wavelength c2 and a plurality of blue LEDs emitting light having the first peak wavelength c1. In an exemplary embodiment, the plurality of first light sources 121*a* and the plurality of second light sources 121*b* may be alternately arranged. However, it is to be understood that the arrangement, shape, and number of the plurality of first light sources 121*a* and the plurality of second light sources 121*b* are not limited to those shown in FIG. 11.

Figure 12A:
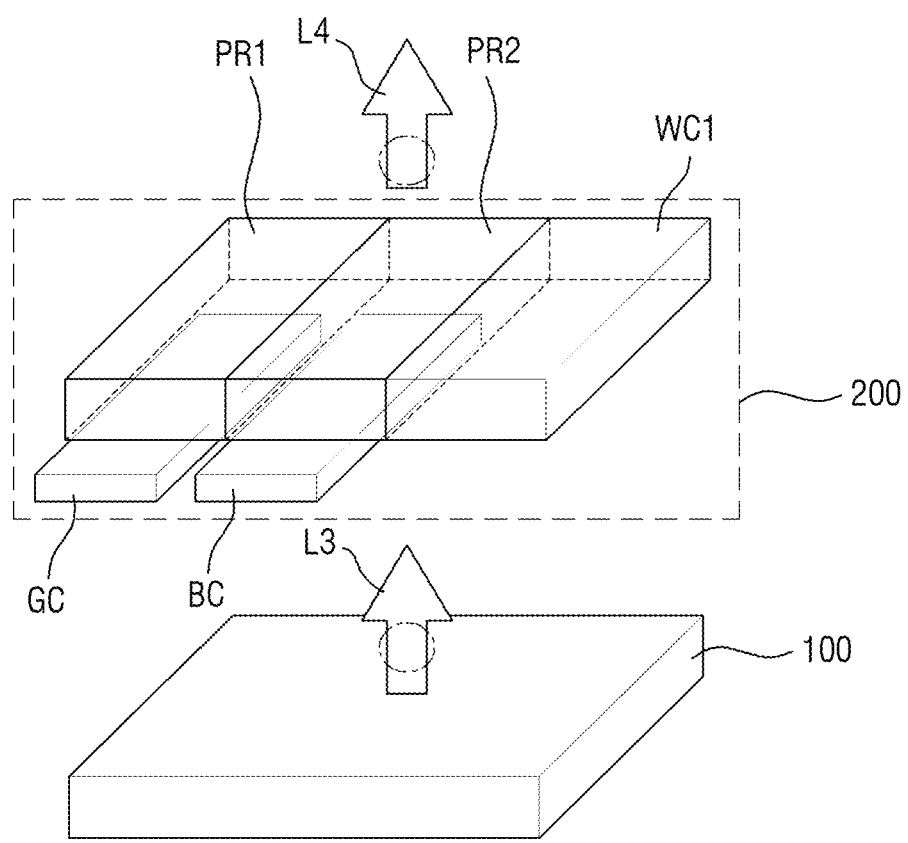
FIG. 12A is a perspective view of another exemplary embodiment of a display device according to the invention.
Figure 12B:
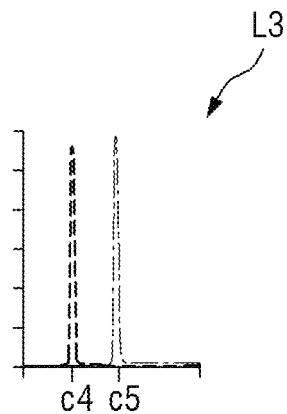
FIGS. 12B and 12C are wavelength graphs of third light and fourth light of the exemplary embodiment of the display device of FIG. 12A.
Figure 12C:
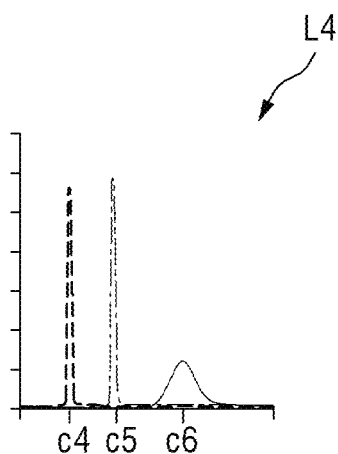

FIG. 12A is a perspective view of a display device according to another exemplary embodiment of the invention, and FIGS. 12B and 12C are wavelength graphs of third light and fourth light of the exemplary embodiment of the display device of FIG. 12A. The elements already described above with respect to FIGS. 1 to 11 will not be described again.

Referring to FIGS. 12A to 12C, the backlight unit 100 may provide third light L3 to the display panel 200. The third light L3 may be a combination of light having a fourth peak wavelength c4 and light having a fifth peak wavelength c5. The light having the fourth peak wavelength c4 may be blue light. The light having the fifth peak wavelength c5 may be green light.

Accordingly, the backlight unit 100 may include blue laser diodes that emit light having the fourth peak wavelength c4 and green laser diodes that emit light having the fifth peak wavelength c5. In an exemplary embodiment, the half-width of each of the fourth peak wavelength c4 and the fifth peak wavelength c5 may be approximately 2 nm, for example.

The third light L3 provided to the display panel 200 passes through the first transmissive layer PR1, the second transmissive layer PR2, the first wavelength conversion layer WC1, the first filter GC and the second filter BC. The fourth light L4 may be a combination of the blue light exiting the first transmissive layer PR1, the green light exiting the second transmissive layer PR2, and the red light exiting the first wavelength conversion layer WC1.

Table 2 below shows the evaluation of the color gamuts of an existing display device and a display device according to another exemplary embodiment of the invention with respect to the color gamut defined by BT. 2020 in %. The existing display device in Table 2 is defined as a device having a backlight unit including LEDs and a display panel with typical color filters.

TABLE 2

|  | BT. 2020 |
|---|---|
| Existing display device | 54.7% |
| Device according to another exemplary embodiment of the invention | 95.5% |

Referring to Table 2, the display device according to the another exemplary embodiment of the invention exhibited the color gamut of approximately 95.5% with respect to the color gamut of BT. 2020. In contrast, the existing display device exhibited the color gamut of approximately 54.1% with respect to the color gamut of BT. 2020. Accordingly, it may be seen that the color gamut of the display device according to the another exemplary embodiment of the invention has been improved as compared with the existing display device.

That is, in the display device according to the another exemplary embodiment of the invention, the light emitted from the backlight unit 100 having the green and blue laser diodes LDs are provided to the display panel 200 having the first wavelength conversion layer WC1, such that the color gamut may be improved, which meets the requirements of BT. 2020.

Although the exemplary embodiments of the invention have been disclosed for illustrative purposes, those skilled in the art would appreciate that various modifications and substitutions may be made without departing from the scope and spirit of the invention. Elements of the exemplary embodiment of the invention may be modified, for example. Such modifications and substitutions are also construed as falling within the scope of the invention as defined by the appended claims.

What is claimed is:

1. A display device comprising:
    a display panel including a plurality of pixels, each pixel having a first sub-pixel, a second sub-pixel and a third sub-pixel; and
    a backlight unit which provides a first light to the display panel, the first light being a combination of light having only two different peak wavelengths, one light having a first peak wavelength and another light having a second peak wavelength,
    wherein the display panel comprises:
    a first substrate;
    a first sub-pixel electrode of the first sub-pixel on the first substrate;
    a second sub-pixel electrode of the second sub-pixel on the first substrate;
    a third sub-pixel electrode of the third sub-pixel on the first substrate;
    a second substrate including a surface facing the first substrate;
    a first transmissive layer disposed on the surface of the second substrate and overlapping the first sub-pixel electrode;
    a second transmissive layer disposed on the surface of the second substrate and overlapping the second sub-pixel electrode;
    a first filter disposed on the surface of the second substrate and overlapping the third sub-pixel electrode, wherein the first filter blocks the light having the first peak wavelength or the light having the second peak wavelength;
    a wavelength conversion layer disposed directly on a surface of the first color filter which faces the first substrate, overlaps the third sub-pixel electrode and converts a peak wavelength of the first light,
    a green cut-off filter disposed on the first transmissive layer, the green cut-off filter directly contacting a surface of the first transmissive layer facing the first substrate and side surfaces of the first transmissive layer;
    a blue cut-off filter disposed on the second transmissive layer and the wavelength conversion layer; and
    a planarization layer disposed directly on the green cut-off filter and the blue cut-off filter;
    wherein the blue cut-off filter directly contacts a surface of the second transmissive layer facing the first substrate, side surfaces of the second transmissive layer, a surface of the wavelength conversion layer facing the first substrate, side surfaces of the wavelength conversion layer and side surfaces of the first filter,
    wherein the backlight unit comprises laser diodes emitting the light having the second peak wavelength,
    wherein the wavelength conversion layer overlaps the third sub-pixel electrode,
    wherein the wavelength conversion layer comprises at least one of quantum dots and phosphor,
    wherein any wavelength conversion layer does not overlap the first sub-pixel electrode and the second sub-pixel electrode,
    wherein the light having the first peak wavelength is blue light, and
    wherein the light having the second peak wavelength is green light.

2. The display device of claim 1, wherein the second peak wavelength ranges from about 528 nanometers to about 534 nanometers.

3. The display device of claim 1, wherein a half-width of the light having the second peak wavelength is narrower than a half-width of the light having the first peak wavelength.

4. The display device of claim 1, wherein a half-width of the light having the second peak wavelength is about 2 nanometer.

5. The display device of claim 1, wherein the wavelength conversion layer receives the light having the second peak wavelength and converts the light having the second peak wavelength into light having a third peak wavelength, and
    wherein the light having the third peak wavelength is red light.

6. The display device of claim 1, wherein the backlight unit further comprises laser diodes which emit the light having the first peak wavelength.

7. The display device of claim 1, wherein a half-width of the light having the first peak wavelength is about 2 nanometers.

8. The display device of claim 1, wherein the first light is cyan light.

* * * * *